(12) United States Patent
Kanda et al.

(10) Patent No.: US 12,000,780 B2
(45) Date of Patent: Jun. 4, 2024

(54) INFORMATION PROCESSING SYSTEM, INFORMATION PROCESSING DEVICE, INFORMATION PROCESSING METHOD, AND PROGRAM

(71) Applicants: JAPAN AEROSPACE EXPLORATION AGENCY, Tokyo (JP); MITSUBISHI ELECTRIC SOFTWARE CORPORATION, Tokyo (JP)

(72) Inventors: Atsushi Kanda, Chofu (JP); Yuji Satoh, Amagasaki (JP); Ippei Uchikata, Amagasaki (JP); Tomotaka Yamamoto, Amagasaki (JP)

(73) Assignees: JAPAN AEROSPACE EXPLORATION AGENCY (JP); MITSUBISHI ELECTRIC SOFTWARE CORPORATION (JP)

( * ) Notice: Subject to any disclaimer, the term of this patent is extended or adjusted under 35 U.S.C. 154(b) by 93 days.

(21) Appl. No.: 17/779,018

(22) PCT Filed: Nov. 25, 2020

(86) PCT No.: PCT/JP2020/043864
§ 371 (c)(1),
(2) Date: May 23, 2022

(87) PCT Pub. No.: WO2021/106945
PCT Pub. Date: Jun. 3, 2021

(65) Prior Publication Data
US 2022/0412887 A1   Dec. 29, 2022

(30) Foreign Application Priority Data

Nov. 28, 2019   (JP) ................. 2019-215755

(51) Int. Cl.
*G01N 21/47*   (2006.01)

(52) U.S. Cl.
CPC ................. *G01N 21/4785* (2013.01)

(58) Field of Classification Search
CPC ............... G01N 21/4785; G01N 21/49; G01N 2021/4733; G01N 21/31;
(Continued)

(56) References Cited

U.S. PATENT DOCUMENTS 5,218,206 A * 6/1993 Schmitt ............... B60R 16/0237
250/341.8
5,781,115 A * 7/1998 Shea ..................... B64D 15/20
340/580
(Continued)

FOREIGN PATENT DOCUMENTS

JP   2000-180357 A   6/2000
JP   2007-147517 A   6/2007
(Continued)

OTHER PUBLICATIONS

Machine Translation of JP-2000180357-A (Year: 2000).*
Fritsch J., et al., "Monocular Road Terrain Detection by Combining Visual and Spatial Information" IEEE Transactions on Intelligent Transportation Systems, vol. 15, No. 4, pp. 1586-1596, Aug. 2014.
International Search Report dated Feb. 16, 2021 in corresponding PCT International Application No. PCT/JP2020/043864.

*Primary Examiner* — Seung C Sohn
(74) *Attorney, Agent, or Firm* — OSTROLENK FABER LLP

(57) ABSTRACT

An information processing system includes an irradiation unit configured to irradiate a deposited material with electromagnetic waves, a detection unit configured to detect scattered waves or transmitted waves of the electromagnetic waves with which the deposited material has been irradiated by the irradiation unit, and a determination unit configured to determine a state of the deposited material from an image based on the scattered waves or the transmitted waves detected by the detection unit.

13 Claims, 8 Drawing Sheets

(58) Field of Classification Search
CPC .... G01N 2201/1296; G01S 2007/4975; G01S 7/4802; G01S 7/481; G01S 7/4816; G01S 17/04; G01S 17/88; G01B 11/02; G01B 11/06; G01B 15/02; G01W 1/00; G06N 20/20; G08B 19/02
See application file for complete search history.

(56) References Cited

U.S. PATENT DOCUMENTS

| | | |
|---|---|---|
| 2007/0121124 A1 | 5/2007 | Nabatova-Gabain et al. |
| 2007/0223785 A1 | 9/2007 | Sano |
| 2012/0076361 A1 | 3/2012 | Fujiyoshi |
| 2020/0340914 A1* | 10/2020 | Kanda .................... G01W 1/00 |

FOREIGN PATENT DOCUMENTS

| | | |
|---|---|---|
| JP | 2007-257148 A | 10/2007 |
| JP | 2015-001379 A | 1/2015 |
| JP | 2015-007605 A | 1/2015 |
| JP | 2016-170069 A | 9/2016 |
| JP | 2019-078720 A | 5/2019 |
| JP | 2020-134347 A | 8/2020 |
| WO | WO 2010/140613 A1 | 12/2010 |

* cited by examiner

INFORMATION PROCESSING SYSTEM, INFORMATION PROCESSING DEVICE, INFORMATION PROCESSING METHOD, AND PROGRAM

CROSS-REFERENCE TO RELATED APPLICATIONS

The present application is a 35 U.S.C. §§ 371 national stage application of PCT/JP2020/043864, filed Nov. 25, 2020, which claims priority to Japanese Patent Application No. 2019-215755 filed on Nov. 28, 2019, the contents of which are incorporated herein by reference. The PCT International Application was published in the Japanese language.

TECHNICAL FIELD

The present invention relates to an information processing system, an information processing device, an information processing method, and a program.

Priority is claimed on Japanese Patent Application No. 2019-215755, filed Nov. 28, 2019, the content of which is incorporated herein by reference.

BACKGROUND ART

For example, materials such as snow, ice, water, and mud are deposited or adhered on a roadway surface or a runway surface. In view of safety management, it is important to monitor the state quantities of such materials. In this regard, techniques of measuring the thickness (depth) of snow accumulating on a roadway surface using the reflection of a laser beam or the like for the purpose of road management are known (for example, see Patent Literatures 1 and 2).

CITATION LIST

Patent Literature

[Patent Literature 1]
Japanese Unexamined Patent Application, First Publication No. 2015-001379
[Patent Literature 2]
Japanese Unexamined Patent Application, First Publication No. 2016-170069

SUMMARY OF INVENTION

Technical Problem

However, in the related art, deposited material states are not accurately determined.

The present invention has been made in consideration of the aforementioned circumstances and an objective thereof is to provide an information processing system, an information processing device, an information processing method, and a program that can accurately determine deposited material states.

Solution to Problem

An aspect of the present invention provides an information processing system including: an irradiation unit configured to irradiate a deposited material with electromagnetic waves; a detection unit configured to detect scattered waves or transmitted waves of the electromagnetic waves with which the deposited material has been irradiated by the irradiation unit; and a determination unit configured to determine states of the deposited material from an image based on the scattered waves or the transmitted waves detected by the detection unit.

Advantageous Effects of Invention

According to the aspect of the present invention, it is possible to accurately determine deposited material states.

DESCRIPTION OF EMBODIMENTS

Hereinafter, an information processing system, an information processing device, an information processing method, and a program according to an embodiment of the present invention will be described with reference to the accompanying drawings. When the present application is translated from Japanese to English, singular forms "a," "an," and "the" used in the whole of the present disclosure may be considered to include plural referents unless clearly mentioned otherwise.

[Configuration of Information Processing System]

Figure 1:
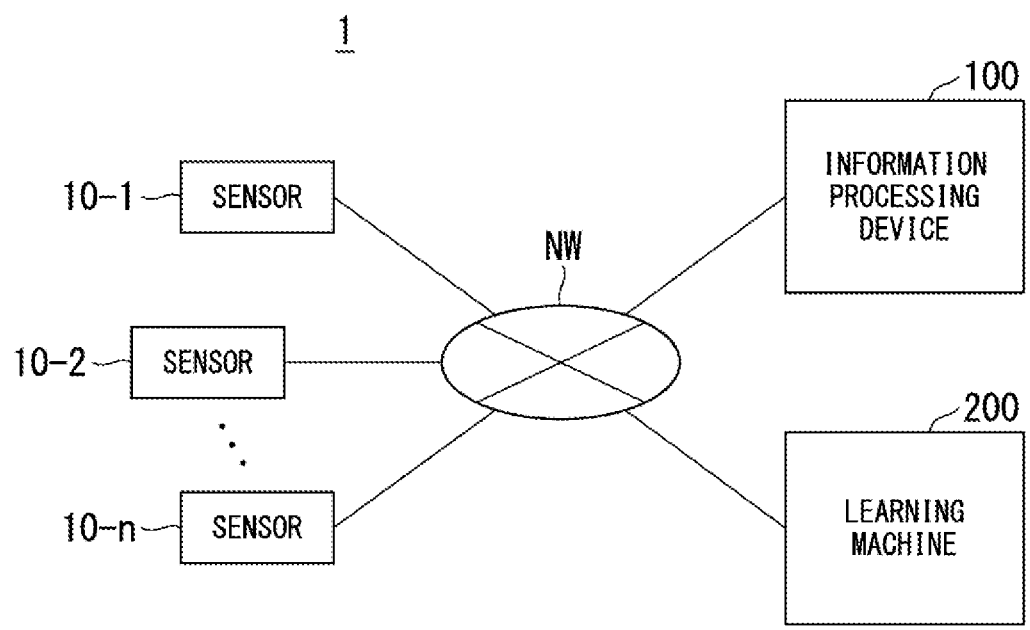
FIG. 1 is a diagram illustrating an example of a configuration of an information processing system according to an embodiment.

FIG. 1 is a diagram illustrating an example of a configuration of an information processing system 1 according to an embodiment. As illustrated in the drawing, the information processing system 1 includes a plurality of sensors 10-1 to 10-$n$ (where n is an arbitrary natural number), an information processing device 100, and a learning machine 200. These devices are connected to a network NW. The network NW is, for example, a wide area network (WAN) or a local area network (LAN). When the plurality of sensors 10-1 to 10-$n$ are not distinguished, the sensors 10-1 to 10-$n$ are collectively referred to as sensors 10.

The sensor 10 is embedded, for example, in the vicinity of a runway, a roadway, or a railway. The sensor irradiates a material deposited in an embedment place, that is, a deposited material, with laser light and detects scattered light or transmitted light of the irradiated laser light. Examples of the deposited material include snow, ice, water, mud, soil, volcanic ash, and sand.

Figure 2:
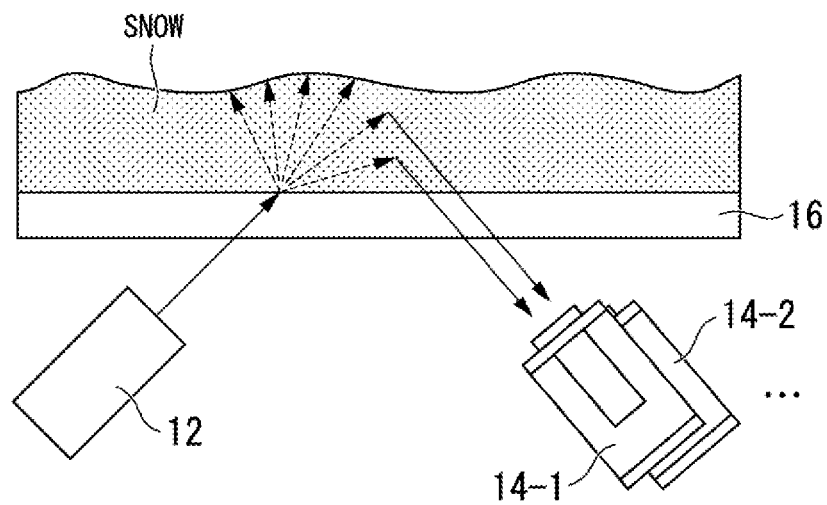
FIG. 2 is a diagram illustrating an example of a sensor according to the embodiment.

FIG. 2 is a diagram illustrating an example of the sensor 10 according to the embodiment. As illustrated in the drawing, the sensor 10 includes an irradiation unit 12 and a plurality of detection units 14 (14-1, 14-2, . . . in the drawing). The irradiation unit 12 and the detection units 14 are covered with a transmissive member 16 such as a resin or glass which transmits light.

The irradiation unit 12 irradiates the outside with a plurality of laser beams having different wavelengths via the transmissive member 16. Specifically, the irradiation unit 12 irradiates the outside with a laser beam of visible light in a certain wavelength band (hereinafter referred to as a first laser beam), a laser beam of visible light with a wavelength longer than that of the first laser beam (hereinafter referred to as a second laser beam), a laser beam of near-infrared light with a wavelength longer than that of the second laser beam (hereinafter referred to as a third laser beam), and a laser beam of near-infrared light with a wavelength longer than that of the third laser beam (hereinafter referred to as a fourth laser beam).

For example, when snow is deposited on the transmissive member 16, the plurality of laser beams emitted from the irradiation unit 12 are reflected by the snow. At this time, some of the laser beams are scattered due to a light scattering phenomenon.

Each of the plurality of detection units 14 detects, for example, a laser beam scattered by the snow deposited on the transmissive member 16, that is, scattered light. For example, out of the plurality of detection units 14, the first detection unit 14-1 detects scattered light of the first laser beam and scattered light of the second laser beam, and the second detection unit 14-2 detects scattered light of the third laser beam and scattered light of the fourth laser beam. When the scattered light is detected, each detection unit 14 transmits a detection signal of the detected scattered light to the information processing device 100 via the network NW.

Figure 3:
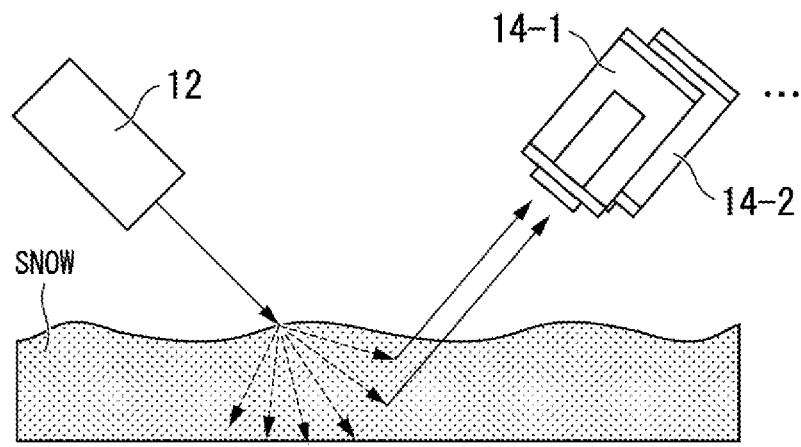
FIG. 3 is a diagram illustrating another example of the sensor according to the embodiment.

The sensor 10 does not have to be embedded in a place in which snow or the like can be deposited. FIG. 3 is a diagram illustrating another example of the sensor 10 according to the embodiment. As illustrated in the drawing, for example, the sensor 10 may be set above a deposited material. In this case, the plurality of detection units 14 irradiate the deposited material with a laser beam from above the deposited material. The plurality of detection units 14 detect scattered light scattered above the deposited material.

The sensor 10 may detect transmitted light instead of detecting scattered light of a laser beam with which the deposited material is irradiated.

Figure 4:
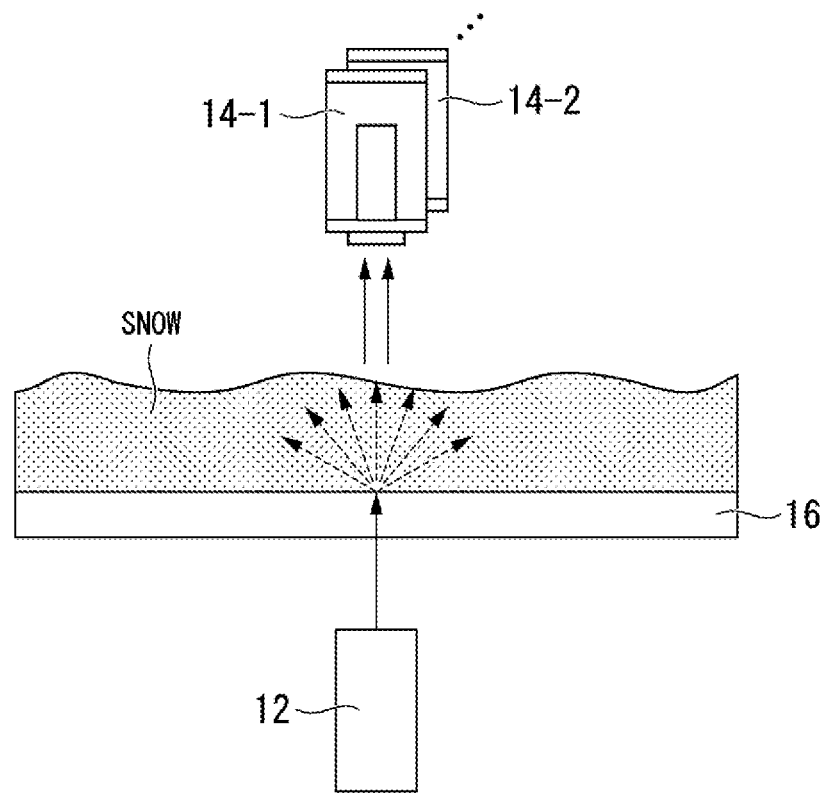
FIG. 4 is a diagram illustrating another example of the sensor according to the embodiment.

FIG. 4 is a diagram illustrating another example of the sensor 10 according to the embodiment. As illustrated in the drawing, for example, the plurality of detection units 14 may be provided at a position opposite to the irradiation unit 12 with the transmissive member 16 interposed therebetween. When the irradiation unit 12 irradiates snow deposited on the transmissive member 16 with a laser beam from below the transmissive member 16, some of the laser beam can be transmitted by the snow. In this case, the detection unit 14 provided at the position opposite to the irradiation unit 12 detects transmitted light of the laser beam emitted from the irradiation unit 12. In the following description, for example, it is assumed that the sensor 10 mainly detects scattered light.

[Configuration of Control Device]

Figure 5:
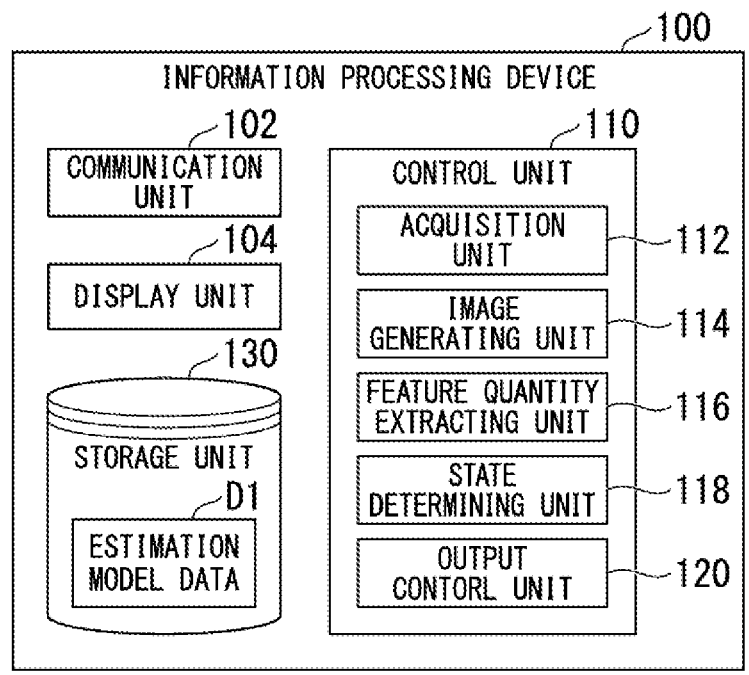
FIG. 5 is a diagram illustrating an example of a configuration of an information processing device according to the embodiment.

FIG. 5 is a diagram illustrating an example of a configuration of the information processing device 100 according to the embodiment. As illustrated in the drawing, the information processing device 100 includes, for example, a communication unit 102, a display unit 104, a control unit 110, and a storage unit 130.

The communication unit 102 is a radio communication module including a receiver and a transmitter and wirelessly communicates with an external device via a network NW. Examples of the external device include the sensor 10 and a learning machine 200. Examples of the external device include an aircraft using a runway in which the sensor 10 is embedded, a vehicle using a roadway in which the sensor 10 is embedded, and a railway vehicle using a railway in which the sensor 10 is embedded.

The external device may include an observation instrument that monitors a surrounding environment of a point at which the sensor 10 is embedded, that is, a point at which a deposited material is present. For example, the observation instrument may monitor various types of weather such as temperature, humidity, and wind speed or may monitor the temperature of the point at which the sensor 10 is embedded (for example, a surface temperature of a runway or a roadway). In this case, the communication unit 102 may acquire various types of observation information from the observation instrument.

The display unit 104 is a user interface that displays various types of information. For example, the display unit 104 displays an image generated by the control unit 110. The display unit 104 may display a graphical user interface (GUI) for receiving various input operations from a user associated with a territory in charge in which the sensor 10 is embedded such as an airport bureau staff, a road bureau staff, or a railway bureau staff. For example, the display unit 104 is a liquid crystal display (LCD) or an organic electroluminescence (EL) display.

The control unit 110 includes, for example, an acquisition unit 112, an image generating unit 114, a feature quantity extracting unit 116, a state determining unit 118, and an output control unit 120.

The elements of the control unit 110 are realized, for example, by causing a processor such as a central processing unit (CPU) or a graphics processing unit (GPU) to execute a program stored in the storage unit 130. Some or all of the elements of the control unit 110 may be realized by hardware such as a large-scale integration (LSI) circuit, an application-specific integrated circuit (ASIC), or a field-programmable gate array (FPGA) or may be cooperatively realized by software and hardware.

The storage unit 130 is realized, for example, by a hard disk drive (HDD), a flash memory, an electrically erasable programmable read only memory (EEPROM), a read only memory (ROM), or a random access memory (RAM). The storage unit 130 stores estimation model data D1 or the like in addition to various programs such as firmware or application programs. For example, the estimation model data D1 may be installed in the storage unit 130 from a learning machine 200 via the network NW or may be installed in the storage unit 130 from a portable storage medium connected to a drive device of the information processing device 100.

The estimation model data D1 is information (a program or a data structure) for defining a model for estimating a state quantity of a deposited material (hereinafter referred to as an estimation model MDL). The estimation model MDL is, for example, a model which has been trained to output a state quantity of an object when a plurality of feature quantities acquired from an image based on scattered light or transmitted light of light with which the object is irradiated are input to the model. Such a model may include, for example, a plurality of neural networks including an input layer, at least one intermediate layer (a hidden layer), and an output layer.

The estimation model data D1 includes, for example, various types of information such as coupling information indicating how units of a plurality of layers of the neural networks are coupled and coupling factors given to data input and output between the coupled units. The coupling information includes, for example, the number of units included in the layers, information for designating a unit type of a coupling destination of each unit, an activation function for realizing each unit, and information of gates provided between units of the hidden layer. The activation function for realizing each unit may be, for example, a rectified linear function (an RLU function), a sigmoid function, a step function, or other functions. For example, the gate selectively transmits or weights data which is transferred between the units according to a value (for example, 1 or 0) returned by the activation function. The coupling factor includes, for example, a weight which is applied to output data when data is output from a unit of a certain layer to a unit of a deeper layer in the hidden layers of the neural networks. The coupling factor may include a bias component specific to each layer.

[Process Flow in Operation (Runtime)]

Figure 6:
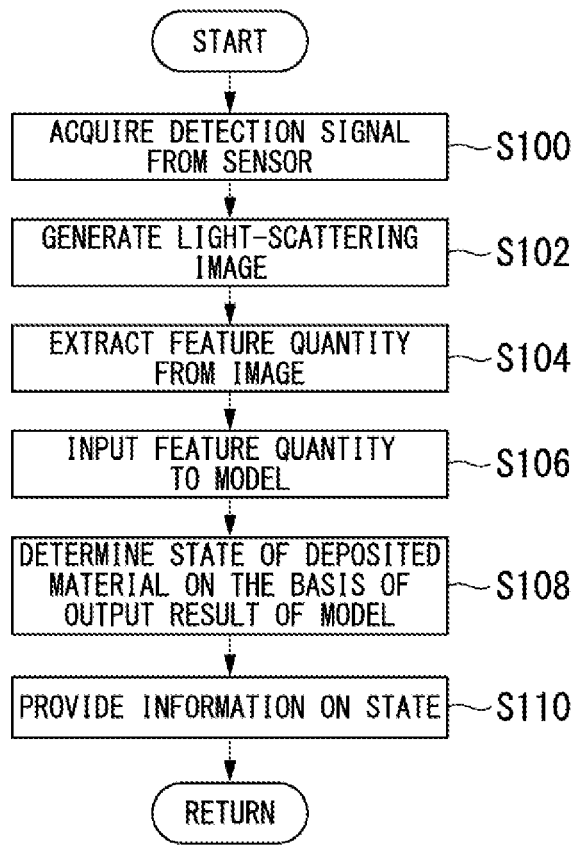
FIG. 6 is a flowchart illustrating an example of a process sequence which is performed by a control unit according to the embodiment.

A flow of a process sequence when the control unit 110 operates will be described below with reference to a flowchart. "Operation (runtime)" means that a state quantity of a deposited material deposited above the sensor 10 (on the top surface of the transmissive member 16) is estimated using an output result form an estimation model MDL trained in advance. FIG. 6 is a flowchart illustrating an example of a flow of a process sequence which is performed by the control unit 110 according to the embodiment. The process sequence of the flowchart may be performed, for example, repeatedly at intervals of a predetermined cycle.

First, the acquisition unit 112 acquires a detection signal of scattered light from the sensor 10 via the communication unit 102 (Step S100).

Then, the image generating unit 114 generates a two-dimensional image (hereinafter referred to as a light-scattering image) in which intensity of scattered light is replaced with a pixel value such as luminance, chroma, or hue based on the detection signal of scattered light acquired by the acquisition unit 112 (Step S102).

For example, when the irradiation unit 12 emits four types of laser light including first laser light, second laser light, third laser light, and fourth laser light, the first detection unit 14-1 detects scattered light of the first laser light and scattered light of the second laser light, and the second detection unit 14-2 detects scattered light of the third laser light and scattered light of the fourth laser light. That is, the detection unit 14 detects four types of scattered light. In this case, the image generating unit 114 generates light-scattering images corresponding to the four types of scattered light.

Then, the feature quantity extracting unit 116 extracts a feature quantity (for example, an area of scattered light) from one or more light-scattering images generated by the image generating unit 114 (Step S104).

Figure 7:
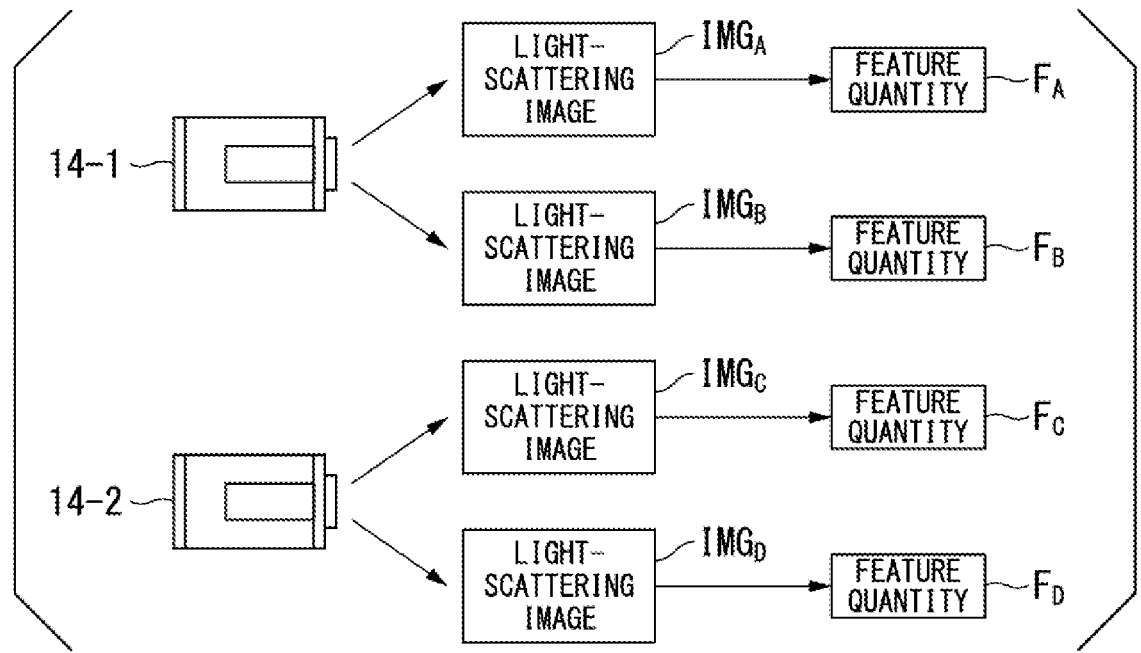
FIG. 7 is a diagram schematically illustrating a situation in which a feature quantity is extracted from a light-scattering image.

FIG. 7 is a diagram schematically illustrating a situation in which a feature quantity is extracted from a light-scattering image. In the illustrated example, a light-scattering image $IMG_A$ corresponding to the scattered light of the first laser light and a light-scattering image $IMG_B$ corresponding to the scattered light of the second laser light are generated on the basis of the result of detection from the first detection unit 14-1, and a light-scattering images $IMG_C$ corresponding to the scattered light of the third laser light and a light-scattering image $IMG_D$ corresponding to the scattered light of the fourth laser light are generated on the basis of the result of detection from the second detection unit 14-2.

In this case, the feature quantity extracting unit 116 extracts feature quantities from four light-scattering images IMG. In the drawing, $F_A$ indicates a feature quantity extracted from the light-scattering image $IMG_A$, $F_B$ indicates a feature quantity extracted from the light-scattering image $IMG_B$, $F_C$ indicates a feature quantity extracted from the light-scattering image $IMG_C$, and $F_D$ indicates a feature quantity extracted from the light-scattering image $IMG_D$.

Description with reference to the flowchart illustrated in FIG. 6 will be continued. Then, the state determining unit 118 inputs a multi-dimensional vector having the plurality of feature quantities extracted by the feature quantity extracting unit 116 as elements (hereinafter referred to as a feature vector F) to the estimation model MDL trained in advance (Step S106). When the estimation model MDL to which the feature vector F has been input outputs a state quantity S of the deposited material, the state determining unit 118 determines a deposited material state on the basis of the state quantity S (Step S108).

[Estimation Model]

Figure 8:
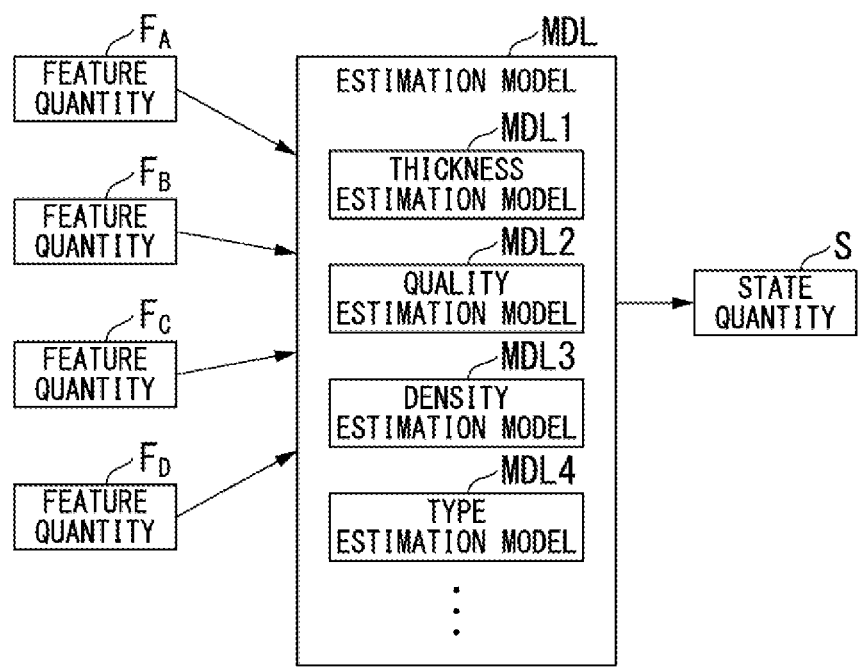
FIG. 8 is a diagram schematically illustrating a situation in which a feature quantity is input to an estimation model.

FIG. 8 is a diagram schematically illustrating a situation in which feature quantities are input to the estimation model MDL. The estimation model MDL includes a plurality of models which have been individually trained according to a type of the state quantity S to be estimated. Examples of the state quantity S include a type, a quality, and physical characteristics of a deposited material. Examples of the physical characteristics include a thickness (depth), a density, and a water content of a deposited material. In this case, the estimation model MDL includes the thickness estimation model MDL1 for estimating a thickness of a deposited material, a quality estimation model MDL2 for estimating a quality of a deposited material, a density estimation model MDL3 for estimating a density of a deposited material, and a type estimation model MDL4 for estimating the type of deposited material. These models may be deep neural networks. The number of models included in the estimation model MDL is not limited to four, and may be two, three, five or more.

For example, when four types of feature quantities $F_A$ to $F_D$ are extracted as illustrated in FIG. 7, a feature vector F having four types of feature quantities $F_A$ to $F_D$ as elements is input to various models such as the thickness estimation model MDL1, the quality estimation model MDL2, the density estimation model MDL3, and the type estimation model MDL4. Each model to which the feature vector F has been input outputs the state quantity S of the deposited material from which the feature quantities are derived.

For example, when the deposited material is snow, the thickness estimation model MDL1 outputs the thickness of the deposited snow as the state quantity S, the quality estimation model MDL2 outputs the quality of the deposited snow as the state quantity S, and the density estimation model MDL3 outputs the density of the deposited snow as the state quantity S. The quality of snow refers to the quality based on the snow grain shape, the water content, or the like.

For example, the quality of snow is roughly classified into "new snow," "compacted snow or pressurized snow," "compacted-type snow," and "granular snow." "New snow" is snow in which much time has not elapsed after the snow has fallen and been piled up and a grain shape of snow is held. "Compacted snow" is snow which has been pressed and solidified by snow removing equipment or the like and which is left on a roadway surface. "Compacted-type snow" includes "lightly compacted snow" in which several days have elapsed after the snow has accumulated and the snow grain shape are mostly not maintained and "compacted snow" in which the "slightly compacted snow" has been further rounded by consolidation and sintering. "Granular snow" is snow that is a combination of rounded ice grains containing water which are large coarsened and rounded ice grains formed by refreezing snow containing water, or the like. For example, the "granular snow" includes "solid-type depth hoar" of ice grains having a flat surface formed through effects of a small humidity gradient and "depth hoar" in which original snow grains are replaced with hoard through effects of a large humidity gradient.

[Thickness Estimation Model]

Figure 9:
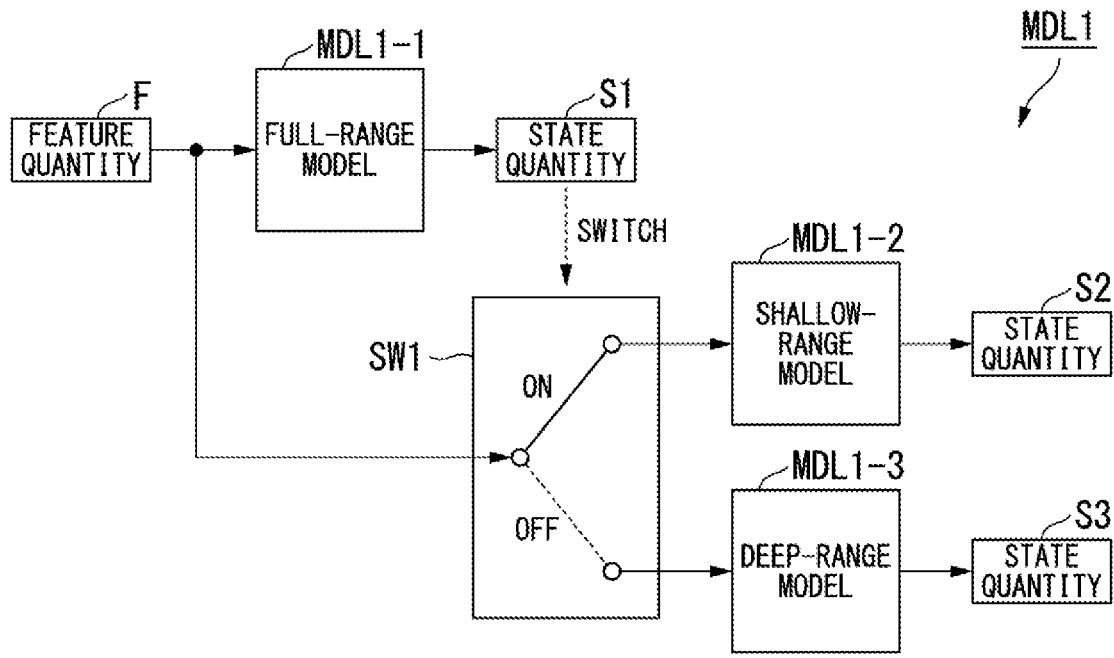
FIG. 9 is a diagram illustrating an example of a specific configuration of a thickness estimation model.

FIG. 9 is a diagram illustrating an example of a specific configuration of the thickness estimation model MDL1. As in the example illustrated in the drawing, the thickness estimation model MDL1 includes a full-range model MDL1-1, a shallow-range model MDL1-2, and a deep-range model MDL1-3.

The full-range model MDL1-1 is a model which has been trained to output a state quantity S1 indicating that an object irradiated with laser light has a thickness in a full range when a plurality of feature quantities F acquired from an image based on scattered light or transmitted light of laser light with which the object having a thickness in a certain range which is possible in practice (hereinafter referred to as a full range) is irradiated are input to the model.

The full range is a range that is a combination of a range equal to or greater than a first threshold value (for example, 5 [mm]) and less than a second threshold value (for example, 30 [mm]) greater than the first threshold value and a range equal to or greater than the second threshold value and less than a third threshold value (for example, 50 [mm]) greater than the second threshold value. That is, the full range is a range equal to or greater than the first threshold value and less than the third threshold value (for example, 5 to 50 [mm]). The range equal to or greater than the first threshold value and less than the second threshold value (for example, 5 to 30 [mm]) is referred to as a "shallow range," and the range equal to or greater than the second threshold value and less than the third threshold value (for example, 30 to 50 [mm]) is referred to as a "deep range." The shallow range is an example of a "first range," the deep range is an example of a "second range," and the full range is an example of a "third range."

The shallow-range model MDL1-2 is a model which has been trained to output a state quantity S2 indicating that an object irradiated with laser light has a thickness in the shallow range when a plurality of feature quantities F acquired from an image based on scattered light or transmitted light of laser light with which the object having a thickness in the shallow range (for example, 5 to 30 [mm]) is irradiated are input to the model.

The deep-range model MDL1-3 is a model which has been trained to output a state quantity S3 indicating that an object irradiated with laser light has a thickness in the deep range when a plurality of feature quantities F acquired from an image based on scattered light or transmitted light of laser light with which the object having a thickness in the deep range (for example, 30 to 50 [mm]) is irradiated are input to the model.

First, the state determining unit 118 inputs a feature vector F to the full-range model MDL1-1 in a previous stage. The full-range model MDL1-1 to which the feature vector F has been input outputs a thickness of a deposited material as the state quantity S1.

On the other hand, the state determining unit 118 selectively inputs part or all of the feature vector F input to the full-range model MDL1-1 to one of the shallow-range model MDL1-2 and the deep-range model MDL1-3 in a subsequent stage.

Specifically, when the full-range model MDL1-1 outputs the thickness of the deposited material as the state quantity S1, the state determining unit 118 switches a switch SW1 according to the thickness. The switch SW1 switches a model to which the feature vector F is input to one of the shallow-range model MDL1-2 and the deep-range model MDL1-3. The switch SW1 may be a software component.

Since the thickness of the deposited material which is output as the state quantity S1 by the full-range model MDL1-1 is in the full range, the output thickness corresponds to one of the shallow range and the deep range. Accordingly, the state determining unit 118 inputs the feature vector F to the shallow-range model MDL1-2 when the thickness output from the full-range model MDL1-1 is in the shallow range and inputs the feature vector F to the deep-range model MDL1-3 when the thickness output from the full-range model MDL1-1 is in the deep range. Then, the state determining unit 118 determines what the thickness of the deposited material is on the basis of the state quantity S2 or S3 output from the model to which the feature vector F has been input.

In this way, since the thickness of the deposited material is estimated with certain accuracy using the full-range model MDL1-1 and the thickness of the deposited material is estimated again using the shallow-range model MDL1-2 or the deep-range model MDL1-3 which is narrower in range and higher in accuracy than the full-range model MDL1-1, it is possible to accurately determine the thickness of the deposited material. The learning method of allowing the shallow-range model MDL1-2 or the deep-range model MDL1-3 in the subsequent stage to estimate the state quantity S using the estimation result from the full-range model MDL1-1 in the previous stage is referred to as boosting which one type of ensemble learning. That is, the full-range model MDL1-1, the shallow-range model MDL1-2, and the deep-range model MDL1-3 are weak learners, and one thickness estimation model MDL1 that is a combination of the models is a strong learner.

The state determining unit 118 may determine the thickness of the deposited material in additional consideration of the state quantity S1 output from the full-range model MDL1-1 in the previous stage in addition to the state quantity S2 or S3 output from the shallow-range model MDL1-2 or the deep-range model MDL1-3 in the subsequent stage.

The shallow range and the deep range included in the full range do not overlap each other. Accordingly, when the thickness of the deposited material output from the full-range model MDL1-1 is close to the second threshold value which is a boundary between the shallow range and the deep range, an estimation error of the full-range model MDL1-1 is more likely to affect estimation accuracy of the final state quantity S in comparison with a case in which the thickness is far from the second threshold value. For example, when the full-range model MDL1-1 outputs a value (for example, 29 [mm]) close to the second threshold value in the shallow range, the likelihood (or probability) that the original thickness (that is, a true value) of the deposited material will be a value in the deep range (for example, 31 [mm]) cannot be ignored in consideration of an estimation error of the full-range model MDL1-1.

Accordingly, when the thickness of the deposited material output from the full-range model MDL1-1 is close to the second threshold value which is the boundary between the shallow range and the deep range, the state determining unit 118 may statistically process the thickness of the deposited material output from the full-range model MDL1-1 and the thickness of the deposited material output from one of the shallow-range model MDL1-2 and the deep-range model MDL1-3 and determine the thickness of the deposited material on the basis of an index value (for example, an arithmetical average or a weighted average) indicating the statistical process result.

[(First) Quality Estimation Model]

Figure 10:
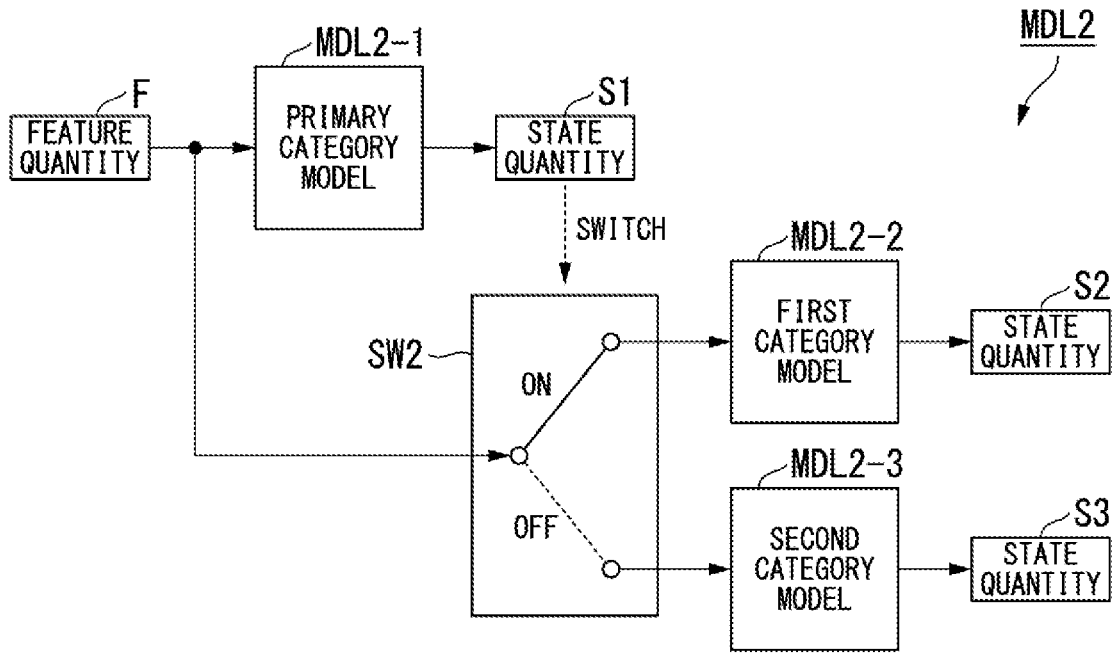
FIG. 10 is a diagram illustrating an example of a specific configuration of a quality estimation model.

FIG. 10 is a diagram illustrating an example of a specific configuration of the quality estimation model MDL2. As in the example illustrated in the drawing, the quality estimation model MDL2 includes a principal category model MDL2-1, a first category model MDL2-2, and a second category model MDL2-3. The principal category model MDL2-1, the first category model MDL2-2, and the second category model MDL2-3 are weak learners, and one quality estimation model MDL2 that is a combination of these models is a strong learner. A category may be replaced with a class.

The principal category model MDL2-1 is a model which has been trained to output a state quantity S1 indicating that an object irradiated with laser light is one of a principal category group when a plurality of feature quantities F acquired from an image based on scattered light or transmitted light of laser light with which the object with a quality corresponding to some categories of the principal category group is irradiated are input to the model.

The principal category group is a category group including a plurality of predetermined categories and is a group of categories into which a quality of a deposited material can be roughly classified. For example, when a deposited material of which the quality is to be estimated is snow, the principal category group includes four types of principal categories such as "new snow," "compacted snow or pressurized snow," "compacted-type snow," and "granular snow."

The first category model MDL2-2 is a model which has been trained to output a state quantity S2 indicating that an object irradiated with laser light belongs to a first category when a plurality of feature quantities F acquired from an image based on scattered light or transmitted light of laser light with which the object with a quality corresponding to a first category is irradiated are input to the model.

The first category is one category included in the principal category group and is a principal category with a subcategory. For example, the first category may be a principal category such as "compacted-type snow" with a subcategory such as "lightly compacted snow" or "compacted snow" or may be a principal category such as "granular snow" with a subcategory such as "dense granular snow" or "coarse granular snow."

The second category model MDL2-3 is a model which has been trained to output a state quantity S3 indicating that an object irradiated with laser light belongs to a second category when a plurality of feature quantities F acquired from an image based on scattered light or transmitted light of laser light with which the object with a quality corresponding to the second category is irradiated are input to the model.

The second category is one category included in the principal category group and is a principal category different from the first category. For example, when the first category is a principal category such as "compacted-type snow," the second category may be a principal category such as "granular snow."

First, the state determining unit 118 inputs a feature vector F to the principal category model MDL2-1 in a previous stage. The principal category model MDL2-1 to which the feature vector F has been input outputs a quality of a deposited material as the state quantity S1. For example, when the principal category group includes four types of principal categories, the principal category model MDL2-1 outputs a four-dimensional vector indicating the plausibility that the quality of the deposited material belongs to each of the four types of principal categories by a likelihood or a probability as the state quantity S1.

On the other hand, the state determining unit 118 selectively inputs part or all of the feature vector F input to the principal category model MDL2-1 to one of the first category model MDL2-2 and the second category model MDL2-3 or does not input to any model.

Specifically, when the principal category model MDL2-1 outputs a quality of the deposited material as the state quantity S1, the state determining unit 118 switches a switch SW2 according to the quality. The switch SW2 switches a model to which the feature vector F is to be input to one of the first category model MDL2-2 and the second category model MDL2-3 or does not switch the model to any. The switch SW2 may be a software component similarly to the switch SW1.

For example, when the deposited material is snow, it is assumed that the state quantity S1 output from the principal category model MDL2-1 indicates that the likelihood of "granular snow" is the highest out of the other principal categories. In this case, the state determining unit 118 controls the switch SW1 such that the model to which the feature vector F is to be input is switched to the second category model MDL2-3 and the feature vector F is input to the second category model MDL2-3. When the second category model MDL2-3 outputs the state quantity S3, the state determining unit 118 determines what quality the deposited material has on the basis of the state quantity S3.

It is assumed that the state quantity S1 output from the principal category model MDL2-1 indicates that the likelihood of a principal category without a subcategory such as "new snow" or "compacted snow" is the highest out of the other principal categories. In this case, the state determining unit 118 does not input the feature vector F to the first category model MDL2-2 or the second category model MDL2-3 and determines the quality of snow on the basis of the state quantity S1.

In this way, since a quality of a deposited material is allocated to principal categories into which qualities are roughly classified and using the principal category model MDL2-1 and the quality of the deposited material is classified to subcategories using the first category model MDL2-2 or the second category model MDL2-3 when the allocated principal category has a subcategory, it is possible to determine the quality of a deposited material with a gradual increase in accuracy.

Similarly to the thickness estimation model MDL1, the state determining unit 118 may statistically process the plurality of state quantities S1 to S3 in addition to the state quantity S1 output from the principal category model MDL2-1 in the previous stage, the state quantity S2 output from the first category model MDL2-2 in the subsequent stage, and the state quantity S3 output from the second category model MDL2-3 and determine the quality of the deposited material on the basis of an index value (for example, an arithmetic average or a weighted average) indicating the statistic process result.

[(Second) Quality Estimation Model]

Figure 11:
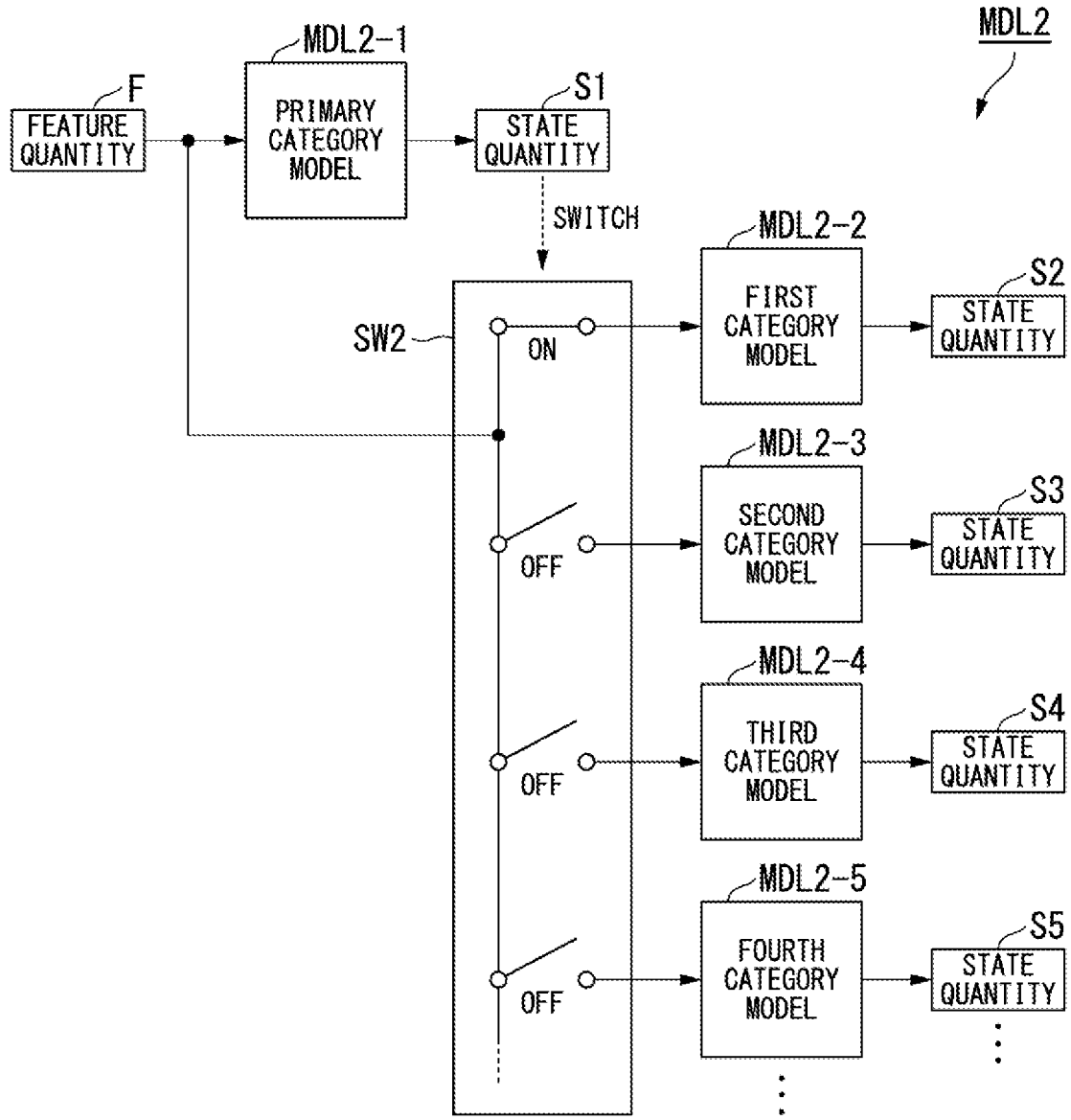
FIG. 11 is a diagram illustrating another example of the specific configuration of the quality estimation model.

FIG. 11 is a diagram illustrating another example of the specific configuration of the quality estimation model MDL2. As in the example illustrated in the drawing, the quality estimation model MDL2 includes another model such as a third category model MDL2-4 or a fourth category model MDL2-5 in addition to the principal category model MDL2-1, the first category model MDL2-2, and the second category model MDL2-3.

The third category model MDL2-4 is a model which has been trained to output a state quantity S4 indicating that an object irradiated with laser light belongs to a third category when a plurality of feature quantities F acquired from an image based on scattered light or transmitted light of laser light with which the object with a quality corresponding to the third category is irradiated are input to the model.

The third category is one category included in the principal category group and is a principal category without a subcategory such as "new snow" or "compacted snow."

The fourth category model MDL2-5 is a model which has been trained to output a state quantity S5 indicating that an object irradiated with laser light belongs to a fourth category when a plurality of feature quantities F acquired from an image based on scattered light or transmitted light of laser light with which the object with a quality corresponding to the fourth category is irradiated are input to the model.

Similarly to the third category, the fourth category is one category included in the principal category group and is a principal category without a subcategory. For example, when the third category is a principal category such as "new snow," the fourth category may be a principal category such as "compacted snow."

When the principal category model MDL2-1 outputs a quality of the deposited material as the state quantity S1, the state determining unit 118 switches the switch SW2 according to the quality. The switch SW2 switches a model to which the feature vector F is to be input to one of the first category model MDL2-2, the second category model MDL2-3, the third category model MDL2-4, and the fourth category model MDL2-5.

For example, when the deposited material is snow, it is assumed that the state quantity S1 output from the principal category model MDL2-1 indicates that the likelihood of a principal category without a subcategory such as "new snow" is the highest out of the other principal categories. In this case, the state determining unit 118 inputs the feature vector F to the third category model MDL2-4. When the third category model MDL2-4 outputs the state quantity S4, the state determining unit 118 determines the quality of the snow on the basis of the state quantity S4. In this way, by performing determination for a principal category without a subcategory such as "new snow" or "compacted snow" as well as a principal category with a subcategory such as "compacted-type snow" or "granular snow" using a model trained in advance for the corresponding principal category, it is possible to more accurately determine the quality of a deposited material.

[Density Estimation Model]

Figure 12:
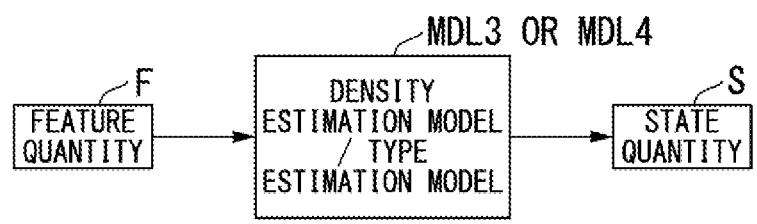
FIG. 12 is a diagram illustrating an example of a density estimation model.

FIG. 12 is a diagram illustrating an example of a specific configuration of the density estimation model MDL3 or the type estimation model MDL4. For example, the density category model MDL3 is a model which has been trained to output a state quantity S indicating that an object irradiated with laser light has a predetermined density when a plurality of feature quantities F acquired from an image based on scattered light or transmitted light of laser light with which the object with the predetermined density is irradiated are input to the model.

The state determining unit 118 inputs the feature vector F to the density estimation model MDL3 and determines the density of the deposited material from which the feature vector F is derived on the basis of the state quantity S output from the density estimation model MDL3.

The type estimation model MDL4 is a model which has been trained to output a state quantity S indicating the type of an object irradiated with laser light when a plurality of feature quantities F acquired from an image based on scattered light or transmitted light of laser light with which the object is irradiated are input to the model.

The state determining unit 118 inputs the feature vector F to the type estimation model MDL4 and determines the type of the deposited material from which the feature vector F is derived on the basis of the state quantity S output from the type estimation model MDL4.

Description with reference to the flowchart illustrated in FIG. 6 will be continued. When the states of the deposited state such as the thickness, the quality, and the density are determined by the state determining unit 118, the output control unit 120 displays information on the state of the deposited material (hereinafter referred to as deposited material state information) on the display unit 104 or transmits the information to the external device via the communication unit 102 (Step S110). The process flow of the flowchart ends in this way.

The deposited material state information may include, for example, a state quantity S such as a thickness, a quality, or a density. The deposited material state information may include information on availability of a place in which the sensor 10 is embedded such as a runway, a roadway, or a railway.

[Configuration of Learning Machine]

The learning machine 200 that learns the estimation model MDL will be described below. The learning machine 200 may be a single device or a system in which a plurality of devices connected to each other via a network NW operate in cooperation. That is, the learning machine 200 may be realized by a plurality of computers (processors) included in a system using distributed computing or cloud computing.

Figure 13:
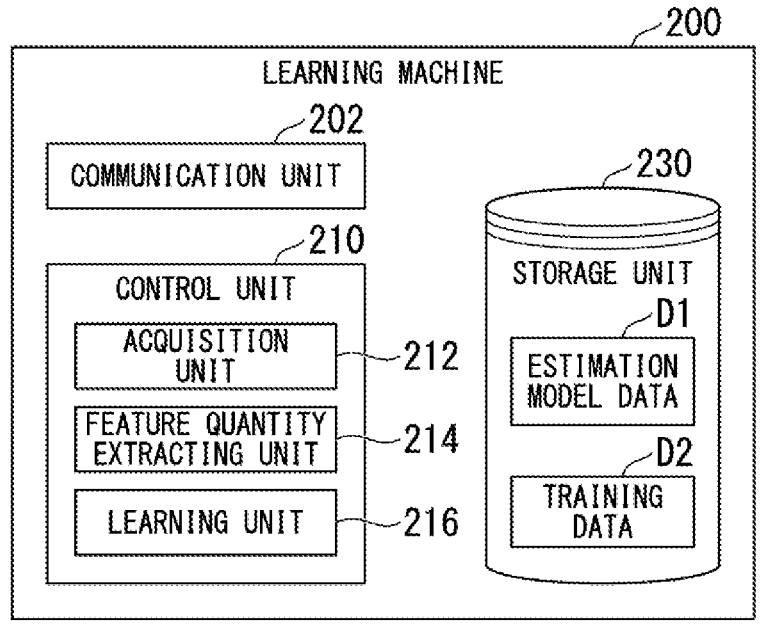
FIG. 13 is a diagram illustrating an example of a configuration of a learning machine according to the embodiment.

FIG. 13 is a diagram illustrating an example of a configuration of the learning machine 200 according to the embodiment. As illustrated in the drawing, for example, the learning machine 200 includes a communication unit 202, a control unit 210, and a storage unit 230.

The communication unit 202 is, for example, a radio communication module including a receiver or a transmitter and communicates with an external device such as the information processing device 100 via the network NW.

The control unit 210 includes, for example, an acquisition unit 212, a feature quantity extracting unit 214, and a learning unit 216. The elements of the control unit 210 are realized, for example, by causing a processor such as a CPU or a GPU to execute a program stored in the storage unit 230. Some or all of the elements of the control unit 210 may be realized by hardware such as an LSI circuit, an ASIC, or an FPGA or may be cooperatively realized by software and hardware.

The storage unit 230 is realized, for example, by an HDD, a flash memory, an EEPROM, a ROM, or a RAM. The storage unit 230 stores the estimation model data D1 and training data D2 in addition to various programs such as firmware or application programs.

The training data D2 is data for training (learning) the estimation model MDL. For example, the training data D2 includes first training data for training the thickness estimation model MDL1, second training data for training the quality estimation model MDL2, third training data for training the density estimation model MDL3, and fourth training data for training the type estimation model MDL4.

The first training data is a data set in which an answer thickness to be output from the thickness estimation model MDL1 as a training label (also referred to as a target) is correlated with an image based on scattered light or transmitted light of laser light with which an object with a known thickness is irradiated.

The second training data is a data set in which a likelihood of a category indicating an answer quality to be output from the quality estimation model MDL2 as a training label is correlated with an image based on scattered light or transmitted light of laser light with which an object with a known quality is irradiated.

The third training data is a data set in which an answer density to be output from the density estimation model MDL3 as a training label is correlated with an image based on scattered light or transmitted light of laser light with which an object with a known density is irradiated.

The fourth training data is a data set in which an answer type to be output from the type estimation model MDL4 as a training label is correlated with an image based on scattered light or transmitted light of laser light with which an object with a known type is irradiated.

[Process Flow for Learning (Training)]

Figure 14:
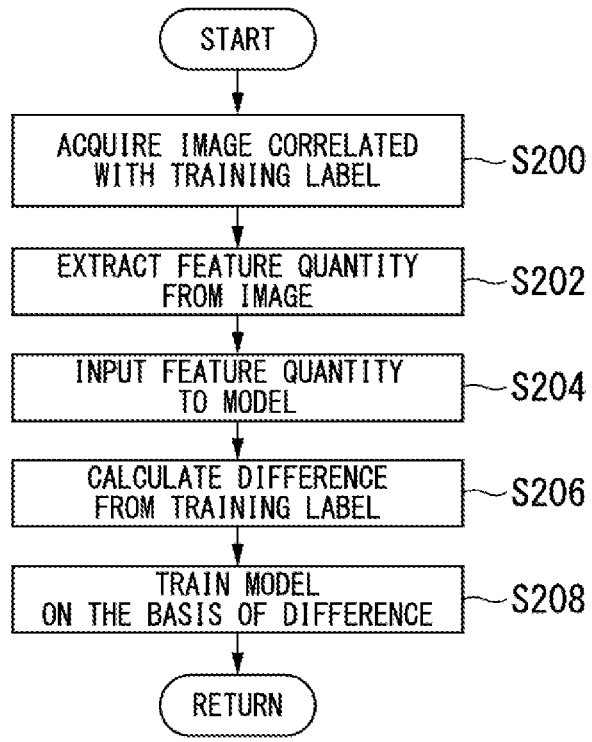
FIG. 14 is a flowchart illustrating an example of a process sequence which is performed by the control unit according to the embodiment.

A flow of a process sequence for training in the control unit 210 will be described below with reference to a flowchart. "Learning (training)" means that an estimation model MDL referred to at the time of operation learns (is trained). FIG. 14 is a flowchart illustrating an example of a process sequence in the control unit 210 according to the embodiment. The processes of the flowchart may be performed, for example, repeatedly at intervals of a predetermined cycle. When the learning machine 200 is realized by a plurality of computers included in a system using distributed computing or cloud computing, some or all of the processes in the flowchart may be performed in parallel by the plurality of computers.

First, the acquisition unit 212 acquires an image (that is, an image based on scattered light or transmitted light) correlated with a training label such as thickness, quality, or density from the training data D2 stored in the storage unit 230 (Step S200).

Then, the feature quantity extracting unit 214 extracts feature quantities from the image acquired from the training data D2 by the acquisition unit 212 (Step S202).

Then, the learning unit 216 inputs a vector having a plurality of feature quantities extracted by the feature quantity extracting unit 214 as elements, that is, a feature vector F, to an untrained estimation model MDL (Step S204).

For example, when attention is paid to the thickness estimation model MDL1 included in the estimation model MDL, the learning unit 216 may input a common feature vector F to the full-range model MDL1-1, the shallow-range model MDL1-2, and the deep-range model MDL1-3 included as weak learners in the thickness estimation model MDL1 or may input different feature vectors F thereto. "Different feature vectors F" may be feature vectors different in the number of elements or may be feature vectors with the same number of elements and with different feature quantities corresponding to the elements.

For example, since first laser light and second laser light in the visible band have longer wavelength than third laser light and fourth laser light in the near-infrared band, the light intensity is likely to attenuate more and a signal intensity of scattered light or transmitted light is likely to become smaller as the deposited material becomes thicker.

Accordingly, the learning unit 216 may preferentially input the feature vector F including many feature quantities extracted from an image based on scattered light or transmitted light of laser light in the visible band to the shallow-range model MDL1-2. The learning unit 216 may preferentially input the feature vector F including many feature quantities extracted from an image based on scattered light or transmitted light of laser light in the near-infrared band to the deep-range model MDL1-3. Accordingly, it is possible to improve estimation accuracy of a thickness of a deposited material using a weak learner.

Since the first laser light and the second laser light in the visible band have longer wavelengths than the third laser light and the fourth laser light in the near-infrared band, the signal intensity of the scattered light or the transmitted light is likely to be weakened due to an influence of attenuation by moisture.

Accordingly, for example, when attention is paid to the quality estimation model MDL2 included in the estimation model MDL, the learning unit 216 may preferentially input a feature vector F including many feature quantities extracted from an image based on scattered light or transmitted light of laser light in the visible band to the second category model MDL2-3 for estimating a category having a relatively large water content such as "granular snow." The learning unit 216 may preferentially input a feature vector F including many feature quantities extracted from an image based on scattered light or transmitted light of laser light in the near-infrared band to the first category model MDL2-2 for estimating a category having a relatively smaller water content such as "compacted-type snow" than the water content of "granular snow." Accordingly, it is possible to improve estimation accuracy of a quality of a deposited material using a weak learner.

Then, the learning unit 216 calculates a difference between the state quantity output from the estimation model MDL and the state quantity correlated as the training label with the image based on the scattered light or the transmitted light (Step S206).

For example, the learning unit 216 calculates a difference between the thickness of the deposited material correlated as the training label with the image from which the feature vector F input to the thickness estimation model MDL1 in the process of Step S204 is extracted and the thickness output as the state quantity from the thickness estimation model MDL1.

The learning unit 216 calculates a difference between the likelihood of the category of the deposited material correlated as the training label with the image from which the feature vector F input to the quality estimation model MDL2 in the process of Step S204 is extracted and the likelihood of the category output as the state quantity from the quality estimation model MDL2.

The learning unit 216 calculates a difference between the density of the deposited material correlated as the training label with the image from which the feature vector F input to the density estimation model MDL3 in the process of Step S204 is extracted and the density output as the state quantity from the density estimation model MDL3.

The learning unit 216 calculates a difference between the likelihood of the type of the deposited material correlated as the training label with the image from which the feature vector F input to the type estimation model MDL4 in the process of Step S204 is extracted and the likelihood of the type output as the state quantity from the type estimation model MDL4.

Then, by using an ensemble learning method such as adaptive boosting, gradient boosting, extreme gradient boosting, the learning unit 216 trains the thickness estimation model MDL1 such that the difference in thickness decreases, trains the quality estimation model MDL2 such that the difference in the likelihood of the category decreases, trains the density estimation model MDL3 such that the difference in density decreases, and learns the type estimation model MDL4 such that the difference in the likelihood of the type decreases (Step S208).

For example, the learning unit 216 may determine (update) a weighting factor, a bias component, and the like which are parameters of the estimation model MDL such that the differences decrease using a stochastic gradient descent method or the like.

The learning unit 216 stores the trained estimation model MDL as the estimation model data D1 in the storage unit 230.

In this way, the learning unit 216 repeatedly performs the processes of Steps S200 to S208 (performs iteration) and learns the estimation model data D1. Then, the learning unit 216 transmits the estimation model data D1 defining the sufficiently trained estimation model MDL to, for example, the information processing device 100 via the communication unit 202. In this way, the process sequence of the flowchart ends.

According to the aforementioned embodiment, since the information processing system 1 includes the irradiation unit 12 that irradiates a deposited material with a plurality of laser light components having different wavelengths, the detection unit 14 that detects scattered light or transmitted light of the laser light with which the deposited material is irradiated by the irradiation unit 12, the image generating unit 114 that generates an image on the basis of the scattered light or the transmitted light detected by the detection unit 14, the feature quantity extracting unit 116 that extracts a plurality of feature quantities from the image generated by the image generating unit 114, and the state determining unit 118 that inputs a feature vector F having the plurality of feature quantities extracted by the feature quantity extracting unit 116 as elements to an estimation model MDL trained in advance and determines a state of the deposited material on the basis of a state quantity S output from the estimation model MDL to which the feature vector F has been input, it is possible to accurately determine the state of the deposited material.

In the related art, when a state of a deposited material is identified on the basis of physical quantities measured using ultrasonic waves, laser light, or the like, a relationship between the physical quantities and the state quantities needs to be apparently defined in advance. When the relationship between the physical quantities and the state quantities is not apparent, it may be difficult to accurately determine in what state the deposited material is. When one state quantity is identified from a plurality of physical quantities in order to improve determination accuracy or when a plurality of state quantities is identified from one or more physical quantities in order to improve functionality, the relationship between the physical quantities and the state quantities becomes complicated and it is very difficult to ascertain the relationship in advance. As a result, it is more difficult to accurately determine the state of the deposited material.

On the other hand, in the embodiment, since the relationship between the physical quantities and the state quantities is learned using the estimation model MDL which is realized by neural networks even when the relationship between the physical quantities and the state quantities are not apparently defined in advance, it is possible to improve robustness and to accurately determine the state of the deposited material.

According to the aforementioned embodiment, since the estimation model MDL is realized by the neural networks, it is also possible to accurately determine a state of an unknown deposited material which has not been used for training or a deposited material in which materials having different qualities are mixed such as water and snow. That is, it is possible to create a model with excellent generalization performance.

In the aforementioned embodiment, the state of the deposited material is determined from a feature vector F extracted from an image of scattered light or transmitted light using the estimation model MDL, but the invention is not limited thereto. For example, when a correlation or the like between the feature vector F extracted from an image of scattered light or transmitted light and the state quantity S indicating the state of the deposited material is expressed by an approximation or a table, the state of the deposited material may be determined from the feature vector F using the approximation or the table instead of using the neural networks for realizing the estimation model MDL. That is, the estimation model MDL may be table data or an approximation.

The state determining unit 118 in the aforementioned embodiment may determine the state of the deposited material by inputting external information such as weather observation information or information of a meteorological model of a point at which the deposited material is present in addition to the feature vector F to the estimation model MDL when the external information is acquired via the communication unit 102 by the acquisition unit 112. The weather observation information may include, for example, a temperature of a point at which the sensor 10 is embedded (for example, a surface temperature of a runway or a roadway), the air temperature or humidity, and the wind speed. The information of a meteorological model may include the air temperature or humidity and the wind speed which are estimated or predicted using the meteorological model.

In the aforementioned embodiment, the feature quantity extracting unit 116 temporarily extracts a feature vector F from an image of scattered light or transmitted light and the feature quantity extracting unit 116 inputs the feature vector F to the estimation model MDL, but the invention is not limited thereto. For example, a model such as a neural network (hereinafter referred to as an extraction model MDL #) may extract the feature vector F from an image of scattered light or transmitted light.

Figure 15:
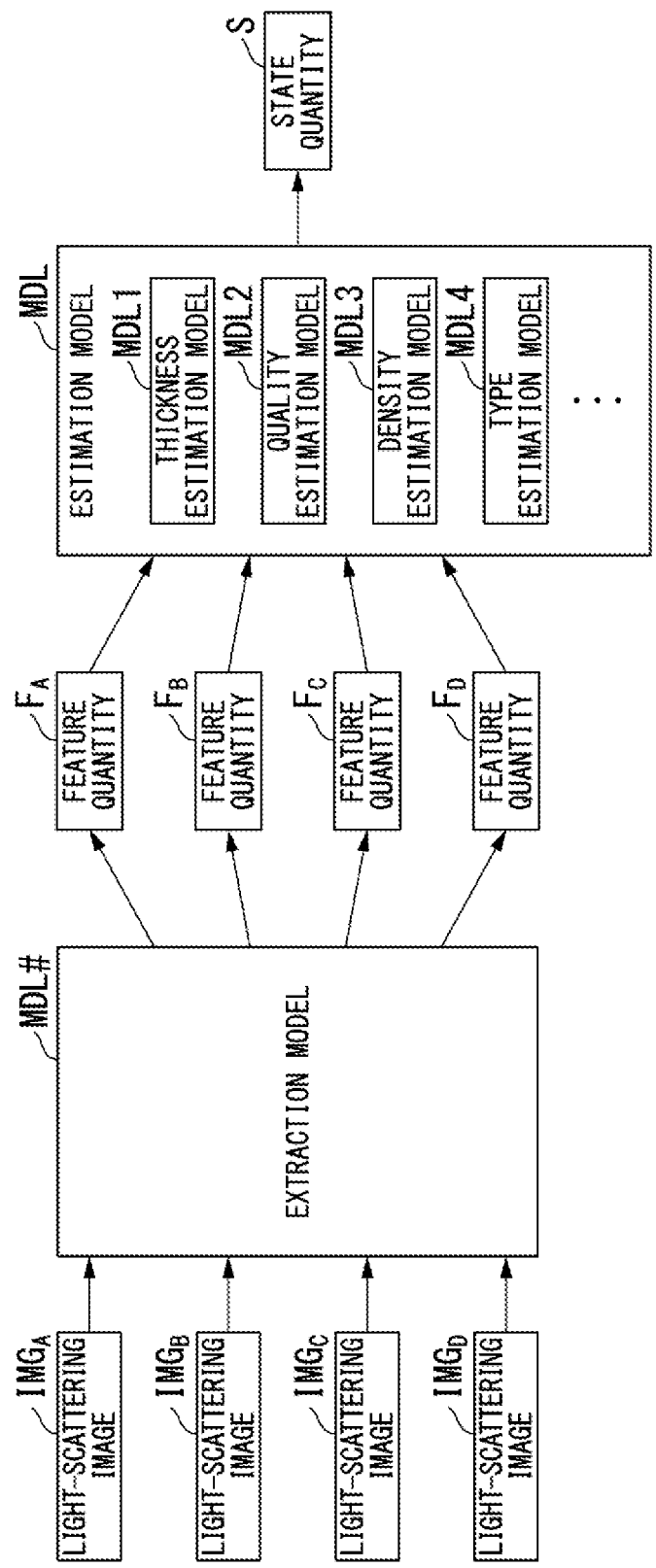
FIG. 15 is a diagram illustrating an example of a model that is a combination of an extraction model and an estimation model.

FIG. 15 is a diagram illustrating an example of a model that is a combination of the extraction model MDL #and the estimation model MDL. As illustrated in the drawing, the extraction model MDL #is provided in a stage prior to the estimation model MDL. The extraction model MDL #is a model which has been trained to output a feature quantity when a light-scattering image IMG or the like is input to the model. The extraction model MDL #may be realized, for example, by a convolutional neural network. In this way, by combining the extraction model MDL #and the estimation model MDL, it is possible to enable a model to learn hyper parameters which are to be considered by a person in association with selection of a feature quantity such as what feature quantity is to be input to a weak learner of the estimation model MDL.

In the aforementioned embodiment, the estimation model MDL is trained by supervised learning, but the invention is not limited thereto. For example, the estimation model MDL may be trained by unsupervised learning. The estimation model MDL may be trained by transfer learning instead of using supervised learning or unsupervised learning. The transfer learning is a method of training a model trained in a certain area (also referred to as a domain) to be adapted to another domain. Accordingly, even when a volume of training data is small, it is possible to create an estimation model MDL with high accuracy.

In the aforementioned embodiment, the sensor 10 irradiates a deposited material with a plurality of laser light components having different wavelengths, but the invention is not limited thereto. For example, the sensor 10 may irradiate the deposited material with light of a single wavelength or light of wideband wavelengths.

In the aforementioned embodiment, the sensor 10 irradiates the deposited material with laser light, but the invention is not limited thereto. For example, the sensor 10 may emit radio waves in addition to or instead of laser light.

While a mode for realizing the present invention has been described above with reference to an embodiment, the present invention is not limited to the embodiment and can be modified or substituted in various forms without departing from the gist of the present invention.

REFERENCE SIGNS LIST

1 Information processing system
10 Sensor
12 Irradiation unit
14 Detection unit
100 Information processing device
102 Communication unit
104 Display unit
110 Control unit
112 Acquisition unit
114 Image generating unit
116 Feature quantity extracting unit
118 State determining unit
120 Output control unit
130 Storage unit
200 Learning machine
202 Communication unit
210 Control unit
212 Acquisition unit
214 Feature quantity extracting unit
216 Learning unit
230 Storage unit
MDL Estimation model

The invention claimed is:

1. An information processing system comprising:
an irradiation unit configured to irradiate a deposited material with electromagnetic waves;
a detection unit configured to detect scattered waves or transmitted waves of the electromagnetic waves with which the deposited material has been irradiated by the irradiation unit;
a determination unit configured to determine a state of the deposited material from an image based on the scattered waves or the transmitted waves detected by the detection unit; and
an extraction unit configured to extract a plurality of feature quantities from the image based on the scattered waves or the transmitted waves detected by the detection unit,
wherein the determination unit is configured to input the plurality of feature quantities extracted by the extraction unit to a model which is learned to output a state quantity of a material when a plurality of feature quantities acquired from an image based on scattered waves or transmitted waves of electromagnetic waves with which the material has been irradiated are input to the model and to determine the state of the deposited material on the basis of output results from the model to which the plurality of feature quantities are input.

2. The information processing system according to claim 1, wherein the determination unit is configured to determine at least one of a type, a quality, and physical characteristics of the deposited material as the state.

3. The information processing system according to claim 1, wherein the model includes a plurality of weak learners, and
wherein the determination unit is configured to determine the state of the deposited material on the basis of output results from the plurality of weak learners.

4. The information processing system according to claim 3, wherein the model includes at least a first model, a second model, and a third model as the weak learners,
wherein the first model is a model which has been trained to output a state quantity indicating that a material having a thickness in a third range that is a combination of a first range equal to or greater than a first threshold value and less than a second threshold value greater than the first threshold value and a second range equal to or greater than the second threshold value and less than a third threshold value greater than the second threshold value has a thickness in the third range when a plurality of feature quantities acquired from an image based on scattered waves or transmitted waves of electromagnetic waves with which the material is irradiated are input to the first model,
wherein the second model is a model which has been trained to output a state quantity indicating that a material having a thickness in the first range has a thickness in the first range when a plurality of feature quantities acquired from an image based on scattered waves or transmitted waves of electromagnetic waves with which the material is irradiated are input to the second model, and
wherein the third model is a model which has been trained to output a state quantity indicating that a material having a thickness in the second range has a thickness in the second range when a plurality of feature quantities acquired from an image based on scattered waves or transmitted waves of electromagnetic waves with which the material is irradiated are input to the third model.

5. The information processing system according to claim 4, wherein the determination unit is configured to:
input the plurality of feature quantities extracted by the extraction unit to the first model;
select one of the second model and the third model on the basis of a first result which is an output result from the first model to which the plurality of feature quantities has been input;
input some or all of the plurality of feature quantities input to the first model to the selected model; and
determine the thickness of the deposited material on the basis of a second result which is an output result from the selected model or a third result that is a combination of the first result and the second result.

6. The information processing system according to claim 5, wherein the determination unit is configured to:
select the second model when a result indicating the thickness of the deposited material is in the first range is output from the first model; and
select the third model when a result indicating that the thickness of the deposited material is in the second range is output from the first model.

7. The information processing system according to claim 3, wherein the model includes at least a first model, a second model, and a third model as the weak learners,
wherein the first model is a model which has been trained to output a state quantity indicating that a material having one of a plurality of qualities has one of the plurality of qualities when a plurality of feature quantities acquired from an image based on scattered waves or transmitted waves of electromagnetic waves with which the material is irradiated are input to the first model,
wherein the second model is a model which has been trained to output a state quantity indicating that a material having a first quality out of the plurality of qualities has the first quality when a plurality of feature quantities acquired from an image based on scattered waves or transmitted waves of electromagnetic waves with which the material is irradiated are input to the second model, and
wherein the third model is a model which has been trained to output a state quantity indicating that a material having a second quality different from the first quality out of the plurality of qualities has the second quality when a plurality of feature quantities acquired from an image based on scattered waves or transmitted waves of electromagnetic waves with which the material is irradiated are input to the third model.

8. The information processing system according to claim 7, wherein the determination unit is configured to:
input the plurality of feature quantities extracted by the extraction unit to the first model;
select one of the second model and the third model on the basis of a first result which is an output result from the first model to which the plurality of feature quantities have been input;
input some or all of the plurality of feature quantities input to the first model to the selected model; and
determine a quality of the deposited material on the basis of a second result which is an output result from the selected model or a third result that is a combination of the first result and the second result.

9. The information processing system according to claim 8, wherein the determination unit is configured to:
select the second model when a result indicating that the quality of the deposited material is the first quality is output from the first model; and
select the third model when a result indicating that the quality of the deposited material is the second quality is output from the first model.

10. The information processing system according to claim 1, further comprising an acquisition unit configured to acquire external information including weather observation information or information predicted using a meteorological model,
wherein the determination unit is configured to further input the external information acquired by the acquisition unit to the model and to determine the state of the deposited material on the basis of an output result from the model to which the plurality of feature quantities and the external information have been input.

11. An information processing device comprising:
an acquisition unit configured to acquire an image based on scattered waves or transmitted waves of electromagnetic waves with which a deposited material is irradiated;
a determination unit configured to determine a state of the deposited material from the image acquired by the acquisition unit; and
an extraction unit configured to extract a plurality of feature quantities from the image based on the scattered waves or the transmitted waves,
wherein the determination unit is configured to input the plurality of feature quantities extracted by the extraction unit to a model which is learned to output a state quantity of a material when a plurality of feature quantities acquired from an image based on scattered waves or transmitted waves of electromagnetic waves with which the material has been irradiated are input to the model and to determine the state of the deposited material on the basis of output results from the model to which the plurality of feature quantities are input.

12. An information processing method performed by a computer, comprising:
acquiring an image based on scattered waves or transmitted waves of electromagnetic waves with which a deposited material is irradiated;
determining a state of the deposited material from the acquired image
extracting a plurality of feature quantities from the image based on the scattered waves or the transmitted waves;
inputting the plurality of feature quantities extracted by the extraction unit to a model which is learned to output a state quantity of a material when a plurality of feature quantities acquired from an image based on scattered waves or transmitted waves of electromagnetic waves with which the material has been irradiated are input to the model; and
determining the state of the deposited material on the basis of output results from the model to which the plurality of feature quantities are input.

13. A computer product, comprising:
a non-transitory computer-readable storage medium storing a program that, upon execution by a computer, causes the computer to perform the information processing method of claim 12.

* * * * *